United States Patent
Claes

(10) Patent No.: US 10,766,245 B2
(45) Date of Patent: Sep. 8, 2020

(54) SLICE AREA DISTRIBUTION FOR OBTAINING IMPROVED PERFORMANCE IN ADDITIVE MANUFACTURING TECHNIQUES

(71) Applicant: MATERIALISE N.V., Leuven (BE)

(72) Inventor: Gert Claes, Leuven (BE)

(73) Assignee: Materialise N.V., Leuven (BE)

( * ) Notice: Subject to any disclaimer, the term of this patent is extended or adjusted under 35 U.S.C. 154(b) by 0 days.

(21) Appl. No.: 15/504,190

(22) PCT Filed: Aug. 17, 2015

(86) PCT No.: PCT/EP2015/068870
§ 371 (c)(1),
(2) Date: Feb. 15, 2017

(87) PCT Pub. No.: WO2016/026820
PCT Pub. Date: Feb. 25, 2016

(65) Prior Publication Data
US 2017/0252978 A1    Sep. 7, 2017

Related U.S. Application Data

(60) Provisional application No. 62/039,300, filed on Aug. 19, 2014.

(51) Int. Cl.
*B33Y 50/02*      (2015.01)
*G05B 19/4099*   (2006.01)
(Continued)

(52) U.S. Cl.
CPC ............ *B33Y 50/02* (2014.12); *B22F 3/1055* (2013.01); *B23K 26/342* (2015.10);
(Continued)

(58) Field of Classification Search
CPC ... B29C 67/0088; B33Y 50/02; B23K 26/342; B23K 26/702; B22F 3/1055;
(Continued)

(56) References Cited

U.S. PATENT DOCUMENTS 8,050,786 B2 * 11/2011 Holzwarth .............. G06F 17/50
                                                                    700/118
2005/0168460 A1 * 8/2005 Razdan ................. G06F 16/904
                                                                    345/419
(Continued)

FOREIGN PATENT DOCUMENTS

WO    2016/026820 A1    2/2016

OTHER PUBLICATIONS

Jin, G.Q., Li, W.D., Tsai, C.F. and Wang, L., 2011. Adaptive tool-path generation of rapid prototyping for complex product models. Journal of manufacturing systems, 30(3), pp. 154-164. (Year: 2011).*

(Continued)

*Primary Examiner* — Rocio Del Mar Perez-Velez
*Assistant Examiner* — Alicia M. Choi
(74) *Attorney, Agent, or Firm* — Patterson + Sheridan, LLP

(57) ABSTRACT

Methods and apparatuses for distributing slice area of objects more uniformly to optimize the build process of additive manufacturing techniques are disclosed. For example, a slice area distribution of a 3D design is calculated. Further, it is determined if the calculated slice area distribution and/or other aspects of the 3D design meets a criteria based on one or more quality metrics. If the calculated slice area distribution and/or other aspects of the 3D design do not meet the criteria, the 3D design is adjusted. The determination and adjustment may be performed itera- (Continued)

tively until the calculated slice area distribution and/or other aspects of the 3D meet the criteria.

21 Claims, 13 Drawing Sheets

(51) Int. Cl.
    *G06T 19/20*      (2011.01)
    *B29C 64/386*     (2017.01)
    *B23K 26/342*     (2014.01)
    *B23K 26/70*      (2014.01)
    *B22F 3/105*      (2006.01)
    *B28B 17/00*      (2006.01)

(52) U.S. Cl.
    CPC ........ *B23K 26/702* (2015.10); *B28B 17/0081* (2013.01); *B29C 64/386* (2017.08); *G05B 19/4099* (2013.01); *G06T 19/20* (2013.01); *B22F 2003/1057* (2013.01); *G05B 2219/49023* (2013.01); *G06T 2219/2016* (2013.01)

(58) Field of Classification Search
    CPC ......... B22F 2003/1057; B28B 17/0081; G05B 19/4099; G05B 2219/49023; G06T 7/0012; G06T 11/006; G01V 1/32
    USPC ......................................................... 700/98
    See application file for complete search history.

(56) References Cited

U.S. PATENT DOCUMENTS

| | | | |
|---|---|---|---|
| 2007/0233298 A1* | 10/2007 | Heide ................... | G06F 17/50 700/98 |
| 2010/0296713 A1* | 11/2010 | Meyer ................ | G06K 9/00147 382/131 |
| 2014/0257547 A1* | 9/2014 | Bachrach ........... | G05B 19/4099 700/118 |
| 2015/0061190 A1* | 3/2015 | Yakubov ................ | B33Y 10/00 264/401 |
| 2016/0236414 A1* | 8/2016 | Reese ................ | G05B 19/4099 |
| 2017/0136708 A1* | 5/2017 | Das ..................... | B29C 35/0805 |
| 2017/0246812 A1* | 8/2017 | Morovic ............. | B29C 64/386 |
| 2018/0079148 A1* | 3/2018 | Deak ................... | B29C 64/386 |
| 2018/0136632 A1* | 5/2018 | Ochiai ............... | G05B 19/4097 |

OTHER PUBLICATIONS

N. Turner, B., Strong, R. and A. Gold, S., 2014. A review of melt extrusion additive manufacturing processes: I. Process design and modeling. Rapid Prototyping Journal, 20(3), pp. 192-204. (Year: 2014).*

International Search Report and Written Opinion, PCT/EP2015/068870, dated Dec. 16, 2015, 13 pages.

Ratnadeep Paul, et al., "Process energy analysis and optimization in selective laser sintering," Journal of Manufacturing System, 31 (2012) 429-437.

* cited by examiner

SLICE AREA DISTRIBUTION FOR OBTAINING IMPROVED PERFORMANCE IN ADDITIVE MANUFACTURING TECHNIQUES

CROSS-REFERENCE TO RELATED APPLICATIONS

This application claims the benefit of U.S. Provisional Application No. 62/039,300, filed Aug. 19, 2014, the entire contents of which are hereby incorporated by reference.

BACKGROUND OF THE INVENTION

Methods of additive manufacturing may involve building objects on a layer by layer basis. Depending on the distribution and orientation of the object(s) to be built, the area of an object to be built for one layer (e.g., area per height) may be different (e.g., larger or smaller) than the area of the object to be built for a different layer. These areas of an object to be built at a particular layer may be referred to as a slice area.

The different areas for different layers means that the building time (e.g., scanning time) at a particular layer with a large area of the object to be built may be, for example, much longer, than the building time at a different layer that has a relatively small area of the object to be built. The longer building time at a particular layer can lead to greater heat generation at the layer, which can lead to issues in the build quality of that layer. For example, the differences in heat generation for different layers can cause different levels of shrinkage for the different layers, thus leading to uneven builds and quality. In addition, the differences in building time for different layers can result in different densities of the materials at the different layers, color differences on the object surface, and bad surface quality of the object. Further, the dimensions of the object may not come out as expected due to the differences in building time for the different layers.

Accordingly, there is a need for apparatuses and methods for better distributing slice area of objects between layers for improved building of the objects using additive manufacturing techniques.

SUMMARY

This application describes methods and apparatuses for improved 3D printing.

In one embodiment, a method for improved 3D printing is disclosed. The method comprises calculating a slice area distribution of a 3D design. The method further comprises determining if based on the calculated slice area distribution a criteria based on one or more quality metrics is met. The method further comprises adjusting the 3D design if the criteria is not met. The method further comprises finalizing the 3D design for manufacture by an additive manufacturing apparatus.

In another embodiment, an apparatus for improved 3D printing is disclosed. The apparatus comprises a memory and a processor. The processor is configured to calculate a slice area distribution of a 3D design. The processor is further configured to determine if based on the calculated slice area distribution a criteria based on one or more quality metrics is met. The processor is further configured to adjust the 3D design if the criteria is not met. The processor is further configured to finalize the 3D design for manufacture by an additive manufacturing apparatus.

In yet another embodiment, non-transitory computer-readable medium comprising instructions that when executed by a computer cause the computer to perform a method for improved 3D printing is disclosed. The method comprises calculating a slice area distribution of a 3D design. The method further comprises determining if based on the calculated slice area distribution a criteria based on one or more quality metrics is met. The method further comprises adjusting the 3D design if the criteria is not met. The method further comprises finalizing the 3D design for manufacture by an additive manufacturing apparatus.

DETAILED DESCRIPTION OF CERTAIN INVENTIVE EMBODIMENTS

Figure 1:
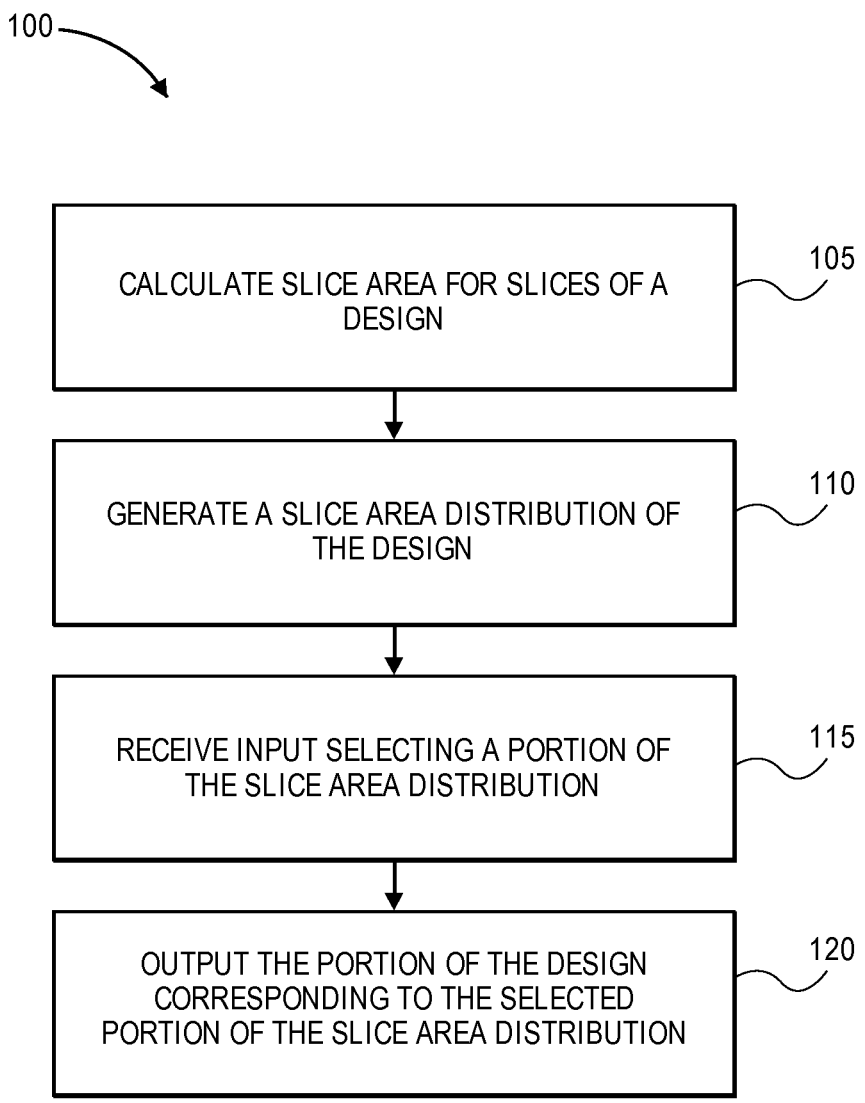
FIG. 1 depicts an example of process for identifying irregularities in the slice area distribution of a 3D design.

The present application discloses apparatuses and methods for distributing slice area of objects more uniformly to optimize the build process of additive manufacturing techniques.

Various optical additive manufacturing technologies that use radiant emitters are known in the art, such as: Stereolithography (SL), Selective Laser Sintering (LS) and Selective Laser Melting (SLM). In cases where a laser emitter is used in SL, LS, or SLM, the process may be generally referred to as Laser Additive Manufacturing (LAM).

Stereolithography (SL) is an optical additive manufacturing technique used for "printing" three-dimensional (3D) objects one layer at a time. An SL apparatus may employ, for example, an Ultraviolet (UV) Laser to cure a photo-reactive substance with emitted radiation. In some embodiments, the SL apparatus directs the UV laser across a surface of a photo-reactive substance, such as, for example, an ultraviolet-curable photopolymer ("resin"), in order to build an object one layer at a time. For each layer, the laser beam traces a cross-section of the object on the surface of the liquid resin, which cures and solidifies the cross-section and joins it to the layer below. After a layer has been completed, the SL apparatus lowers a manufacturing platform by a distance equal to the thickness of a single layer and then deposits a new surface of uncured resin (or like photo-reactive material) on the previous layer. On this surface, a new pattern is traced thereby forming a new layer. By repeating this process one layer at a time, a complete 3D part may be formed.

Stereolithography may require the use of structures that attach and support the object being formed to the manufacturing platform in order to prevent deflection due to gravity and other manufacturing steps (such as depositing new surfaces). Support structures may be generated during the creation of a Computer Aided Design (CAD) model of the object to be manufactured. Support structures are typically removed from the finished product.

Selective laser sintering (LS) is another optical additive manufacturing technique used for 3D printing objects. LS apparatuses often use a high-powered laser (e.g. a carbon dioxide laser) to "sinter" (i.e. fuse) small particles of plastic, metal, ceramic, or glass powders into a 3D object. Similar to SL, the LS apparatus may use a laser to scan cross-sections on the surface of a powder bed in accordance with a CAD design. Also similar to SL, the LS apparatus may lower a manufacturing platform by one layer thickness after a layer has been completed and add a new layer of material in order that a new layer can be formed. In some embodiments, an LS apparatus may preheat the powder in order to make it easier for the laser to raise the temperature during the sintering process.

Unlike SL, LS does not necessarily require support structures because the object being formed may be surrounded by un-sintered powder at all times, which provides support for the object. Therefore, objects manufactured by this method may not require the step of removing support structures.

Selective Laser Melting (SLM) is yet another optical additive manufacturing technique used for 3D printing objects. Like LS, an SLM apparatus typically uses a high-powered laser to selectively melt thin layers of metal powder to form solid metal objects. While similar, SLM differs from LS because it typically uses materials with much higher melting points. When constructing objects using SLM, thin layers of metal powder may be distributed using various coating mechanisms. Like SL and LS, a manufacturing surface moves up and down to allow layers to be formed individually.

Using these various additive manufacturing technologies, in some cases one 3D object is printed at a time, and in some cases, multiple 3D objects are printed at a time. For example, LS may be used by an additive manufacturing apparatus to print multiple 3D objects at a given time. The multiple 3D objects may be nested in 3D in the total volume that the additive manufacturing apparatus can print. This means that the multiple 3D objects are placed in the total volume in a manner that they all fit in the total volume.

Whether printing one 3D object or multiple 3D objects, the overall 3D design to be printed (i.e., the design being the one or more 3D objects to be printed arranged in 3D as they are to be printed by the additive manufacturing apparatus) is stored or represented as a digital 3D representation (e.g., CAD, STL, etc.) of the overall design. The 3D representation of the overall design is divided into layers or slices, where each slice represents a single layer to be printed at a time using the additive manufacturing apparatus.

For example, the design can be considered as sitting in a 3D space defined by an x-axis, a y-axis, and a z-axis. The design is then sliced horizontally into layers in the xy plane along the z-axis. Accordingly, each slice comprises the substantially 2D area (though it is known that the layer will have some 3D height to it) of the design to be printed in the xy plane at a specific height along the z-axis. The slice area is the overall area (e.g., square centimeters) in the xy plane that is to be printed for a given slice of the design. As discussed above, it may be desirable to reduce the variation in the slice area between slices of a design. Accordingly, apparatuses and methods for more uniformly distributing slice area between slices of a design are described herein.

FIG. 1 depicts an example of a process for identifying irregularities in the slice area distribution of a design. At a block 105, the slice area is calculated for slices of the design using a computing device based on the digital 3D representation of the design. In some embodiments, the slice area is calculated for each slice of the design. In some embodiments, the slice area is calculated for 1 out of every N slices, where N is a positive integer (e.g., 10). For example, the slice area may only be calculated for 1 out of every 10 slices, meaning that every $10^{th}$ slice along the z-axis of the volume of the design is selected for slice area calculation. Skipping some slices for slice area calculation may be advantageous as slice area calculation may be computationally expensive and/or time consuming, and further may not change significantly between slices that are close in height to each other.

Figure 2:
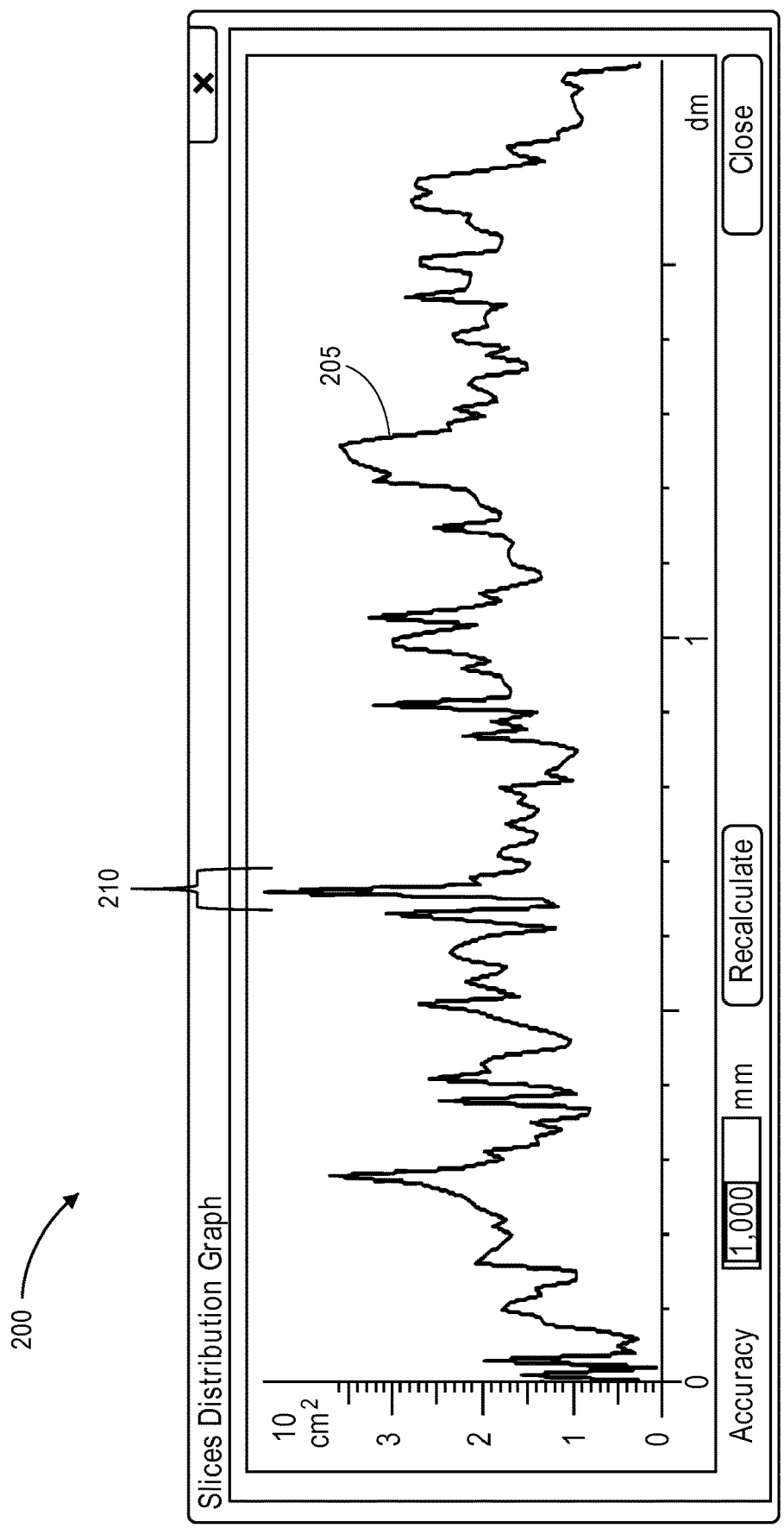
FIG. 2 depicts an example of a graph indicating the slice area distribution for a 3D design.

At a block 110, the slice areas for the layers of the design are used to generate a slice area distribution of the design. The slice area distribution is the slice area of each slice of the design at heights along the z-axis of the design. In some embodiments, the slice area distribution is stored as data in a suitable format such as a database or file. In some embodiments, the data may be used to generate a graph using the computing device, such as that depicted in FIG. 2. FIG. 2 depicts an example of a graph 200 indicating the slice area distribution for a design as a curve 205. The x-axis of the graph indicates the depth or height of the slice along a z-axis of the printing volume. The y-axis of the graph indicates the slice area of the slice.

At a block 115, an input is received at the computing device, such as from a user of the computing device, selecting a particular area of the slice area distribution, for example, by selecting a particular area on the graph along the x-axis corresponding to a particular slice or set of slices. For example, a user may select an area along the graph that has a large slice area as compared to other areas of the graph (e.g., area 210).

At a block 120, a representation of the portion of the design corresponding to the selected area along slice area distribution is output from the computing device to the user, such as through a visual representation on a monitor of the computing device. A user may utilize this information to manually adjust the design in 3D space, such as rotating objects, moving them up and down along the z-axis, and rearranging the placement of objects with respect to each other if there are multiple 3D objects in the design. Such manual adjustment of the design in 3D space, however, may be time consuming and further may not be feasible if the number of possible adjustments is too great.

Figure 3:
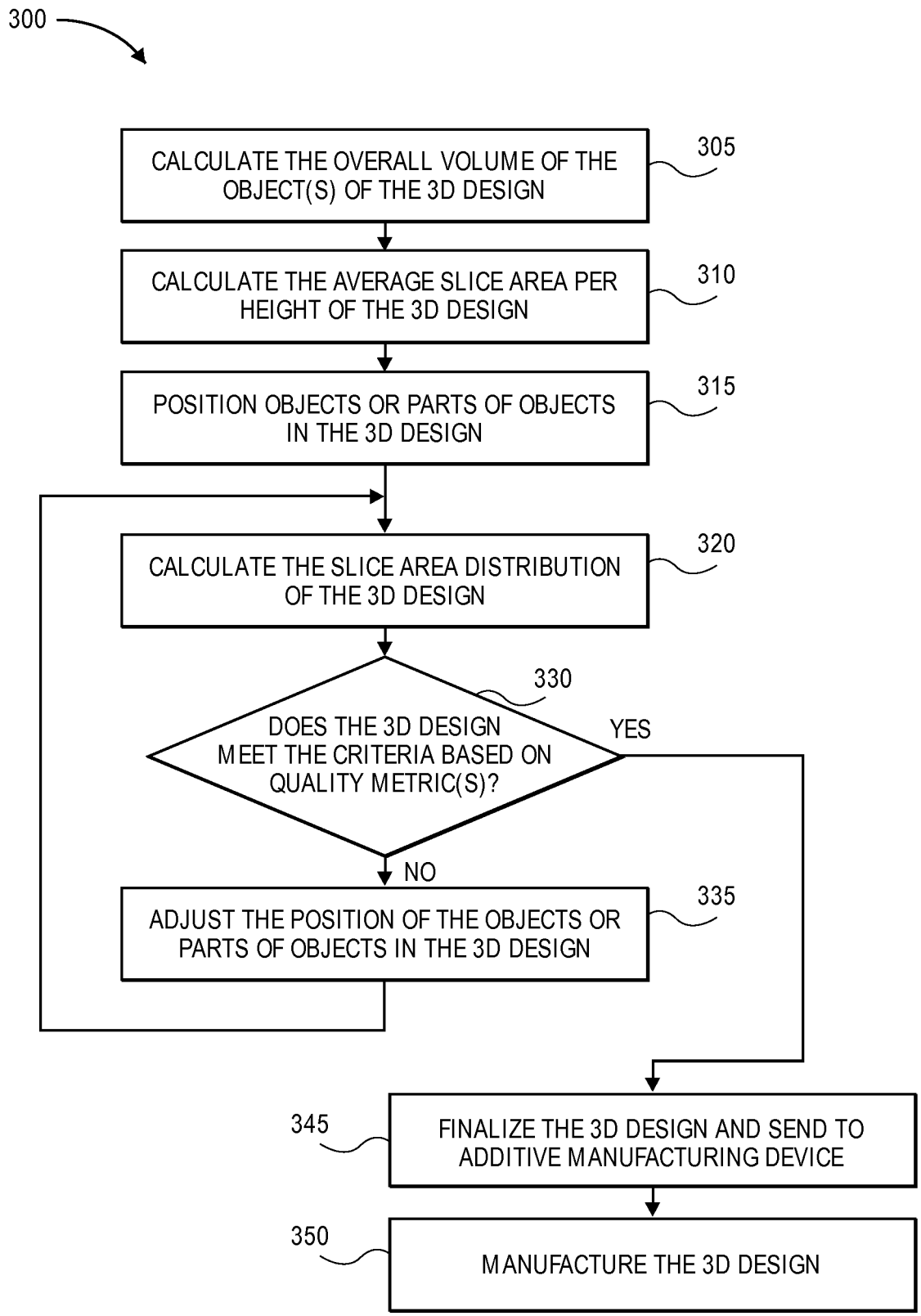
FIG. 3 depicts an example of an automated process for distributing the slice area of a 3D design represented by a digital 3D representation using a computing device.

FIG. 3 depicts an example of an automated process for distributing the slice area of a 3D design represented by a digital 3D representation using a computing device. At a block 305, the overall volume of the object(s) to be part of the 3D design is calculated, including all (if more than one) 3D objects of the design. This is based on the dimensions of the objects in the design.

Figure 4:
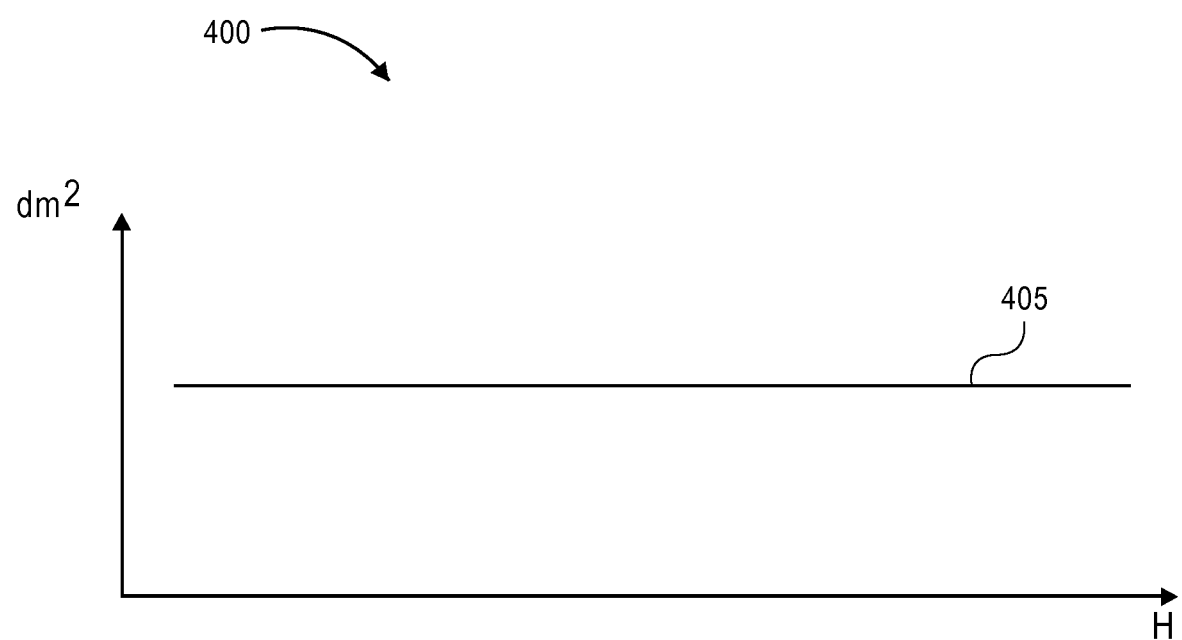
FIG. 4 depicts an example of a graph indicating an ideal slice area distribution for a 3D design.

At a block 310, the average occupied surface area or average slice area per height is optionally calculated by the computing device. This may be calculated by dividing the overall volume of the object(s) of the design, by the height of the 3D space the additive manufacturing apparatus is capable of printing within or some lesser defined height. For example, the additive manufacturing apparatus may have a maximum height, width, and length it can print within, defining a maximum print volume. The actual height, width, and length (and accordingly the actual print volume) used for printing may be defined to each be equal to or less than the corresponding maximum values. This average slice area per height is the ideal case where each slice of the design has the same slice area. This ideal case is represented by a graph 400 as shown in FIG. 4 that, like the graph of FIG. 2, depicts the ideal slice area distribution of the design as a curve 405. In some embodiments, the actual height for printing may be adjustable and/or minimized as discussed below as part of the process 300.

At a block 315, objects or parts of objects, including non-fixed objects or parts of objects and fixed objects or parts of objects to be part of the 3D design, if any, are appropriately positioned in a digital 3D representation of the actual print volume to form a 3D design. The positioning of the objects may be performed, for example, automatically using an application (e.g., 3D nester or 2D nester) on the computing device, or be performed with manual intervention by a user using an application on the computing device. Fixed objects include any objects or parts of objects that due to space constraints, design constraints (e.g., large flat surfaces may need to be parallel to the platform of the additive manufacturing apparatus, some parts are fixed to other parts and cannot be repositioned, etc.), and/or other factors are required to occupy a particular portion of the volume of the 3D space within which the 3D design is to be printed. The result of the positioning may be a 3D design with both the fixed objects (if any) and non-fixed objects.

At a block 320, the slice area distribution of the 3D design, including both the fixed objects (if any) and non-fixed objects is calculated, such as described with respect to the process 100.

At a block 330, the slice area distribution and/or other aspects of the 3D design may be measured against one or more quality metrics by the computing device.

Figure 7:
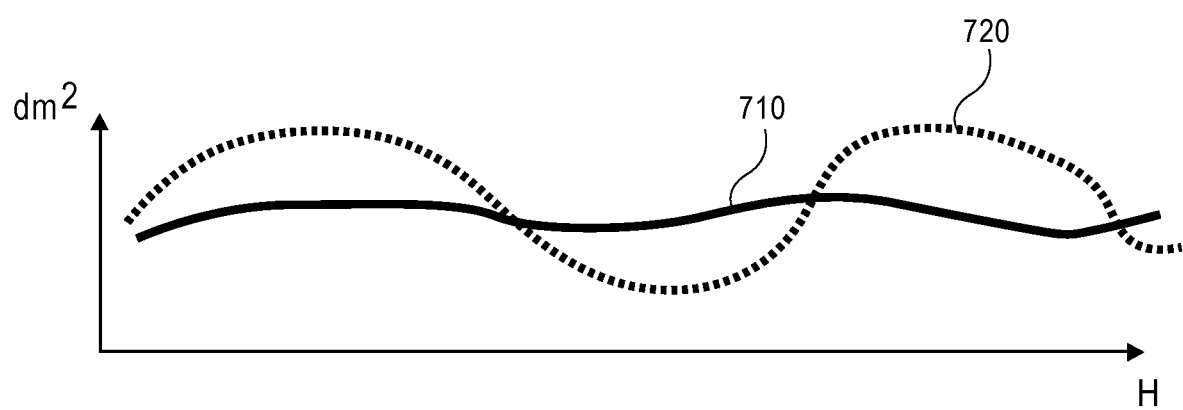
FIG. 7 depicts an example of a graph that represents the slice area distribution of two 3D designs for comparison of amplitude of the slice area distribution of the two 3D designs.

In some embodiments, the quality metrics may be or be based on one or more of the following parameters: an amplitude, frequency, smoothness, and/or direction of a curve as defined by a graphical representation of the slice area distribution. For example, as shown in FIG. 7, a curve of the slice area distribution with a lower amplitude as shown by line 710 is preferred over a curve with a higher amplitude as shown by line 720. This is because a large amplitude difference between parts can result in color differences in different layers, deviations in sizes of the objects printed, and/or different densities of materials at different layers.

Figure 8:
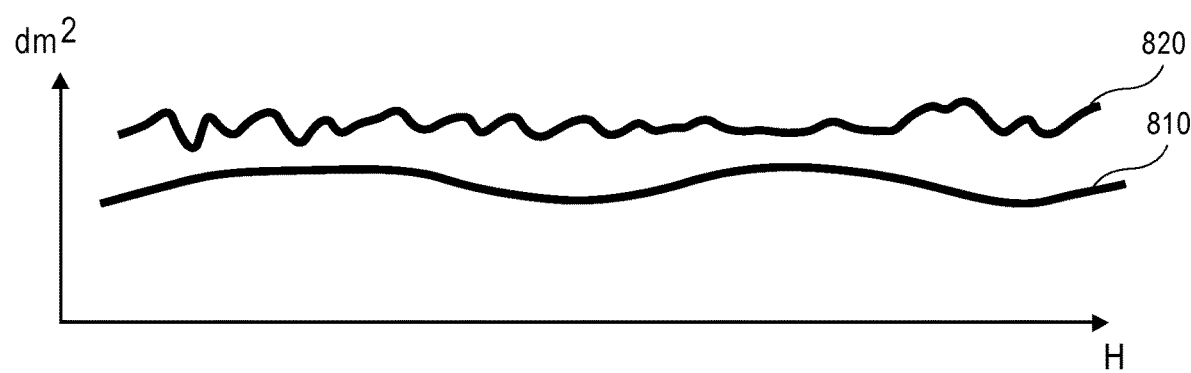
FIG. 8 depicts an example of a graph that represents the slice area distribution of two 3D designs for comparison of frequency of the slice area distribution of the two 3D designs.

As another example, as shown in FIG. 8, a curve of the slice area distribution with a lower frequency as shown by line 810 is preferred over a curve with a higher frequency as shown by line 820. This is because a higher frequency can adversely affect surface quality of the printed object.

Figure 9:
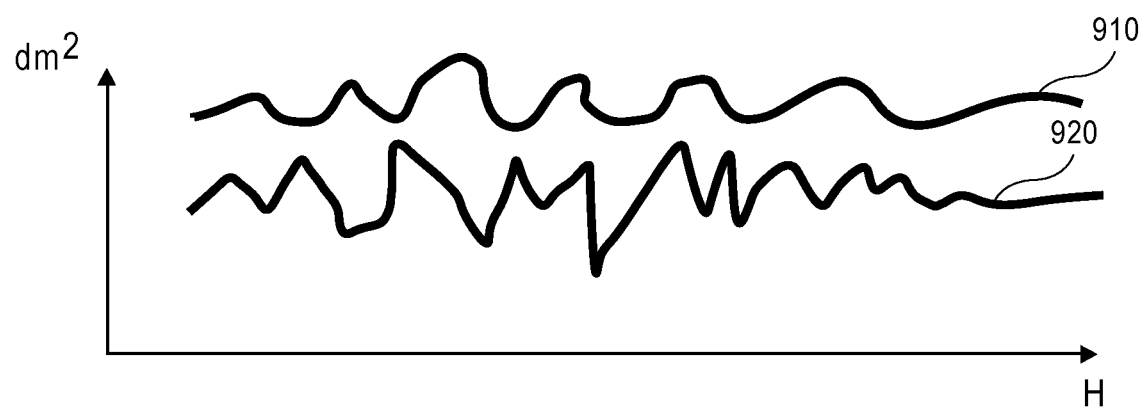
FIG. 9 depicts an example of a graph that represents the slice area distribution of two 3D designs for comparison of smoothness of the slice area distribution of the two 3D designs.

In another example, as shown in FIG. 9, a curve of the slice area distribution with a smoother curve as shown by line 910 is preferred over a curve with a large changes or jumps in slice area distribution between adjacent heights as shown by line 920. The smoothness of the curve, in some embodiments, may be measured by calculating the derivatives of the function defining the curve.

Figure 10:
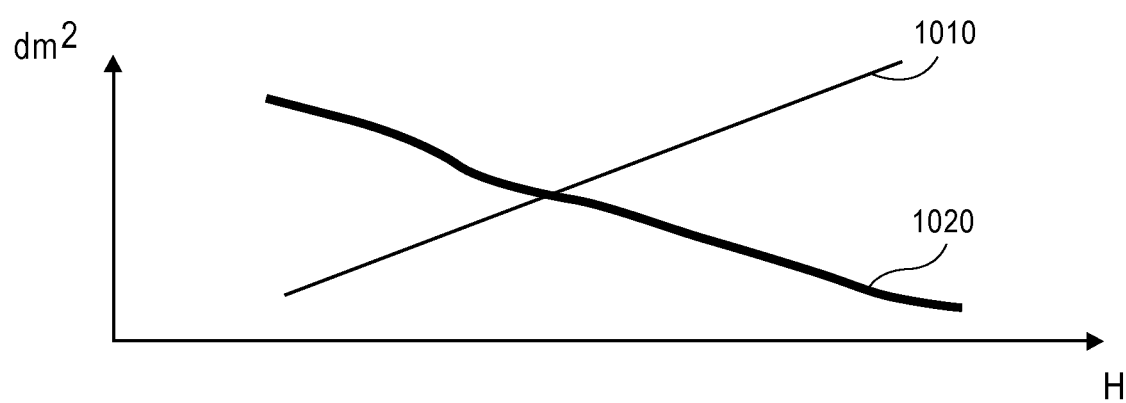
FIG. 10 depicts an example of a graph that represents the slice area distribution of two 3D designs for comparison of slope of the slice area distribution of the two 3D designs.

In yet another example, as shown in FIG. 10, a curve of the slice area distribution with a generally upward curve as shown by line 1010 is preferred over a generally downward curve as shown by line 1020. This is because the bottom of the platform that holds the 3D design as it is being printed may be heated, and thus the largest heat generation by the heated platform is at the bottom of the 3D design by the platform. To offset the heat generation at the bottom of the 3D design by the platform, a smaller slice area is desired at the bottom of the 3D design, and a larger slice area is desired at the top of the 3D design to help even out the heat generation over the entire 3D design.

In some embodiments, the quality metric may be the maximum slice area minus the minimum slice area for all slices within the surface area distribution. It may be desirable to minimize this value. In another embodiment, the quality metric may the maximum difference in slice area between adjacent slices. It may be desirable to minimize this value. In particular, in some embodiments, the difference in slice area between each set of adjacent slices may be calculated, and the maximum value amongst those values is minimized. In some embodiments, an adjacent slice may mean a slice that is directly next to another slice. In some embodiments, an adjacent slice may mean a slice that is within N slices of another slice, where N is a positive integer. In another embodiment, the quality metric may be the maximum slice area among the slices of the 3D design. It may be desirable to minimize this value.

In some embodiments, where the actual height for printing is adjustable, the quality metric may be the overall height of the 3D design. In some such embodiments, it may be desirable to minimize the overall height of the 3D design. This may, for example, allow for savings on the amount of raw material (e.g., powder) used to manufacture the 3D design.

Accordingly, at the block 330, it is determined if the slice area distribution and/or other aspects of the 3D design meets certain criteria (e.g., one or more criteria) based on the one or more quality metrics. In some embodiments, the one or more quality metrics and/or criteria used are predetermined. In some embodiments, the one or more quality metrics and/or criteria are presented to the user and made user selectable, via the computing device, such that the one or more quality metrics and/or criteria used are the ones selected by the user.

For example, in some embodiments, it may be determined whether the quality metric meets a certain threshold level, the threshold being the criteria. For example, the maximum slice area minus the minimum slice area; the maximum difference in slice area between adjacent slices; the maximum slice area among the slices; and/or the overall height of the 3D design may each need to be below a certain respective value or respective threshold level. In some embodiments, additionally or alternatively, the quality metric and threshold level may be, the maximum amplitude of the curve as discussed above needs to be below a threshold level; the maximum frequency of the curve as discussed above needs to be below a threshold level; the maximum smoothness or derivative of the curve needs to be above or below a threshold level depending on his it is measure to ensure a smoother curve; and/or the general slope or direction of the curve, such as defined by a best fit line, needs to be above a threshold level. Where more than one quality metric is measured, there may be an overall quality metric based on the multiple quality metrics, and an overall threshold level. The overall quality metrics may be calculated based on a formula including the multiple quality metrics, and the overall threshold chosen accordingly. In some embodiments, some quality metrics may be weighted more than others in the overall quality metric. In embodiments where the criteria comprises one or more thresholds, if the one or more quality metrics and/or overall quality metric of the slice area distribution and/or other aspects of a 3D design satisfy the criteria, the 3D design is selected as the 3D design for printing and the process 300 moves to a block 345. In embodiments where the criteria comprises one or more thresholds, if the one or more quality metrics and/or overall quality metric of the slice area distribution and/or other aspects of a 3D design do not satisfy the criteria, the process 300 moves to a block 335.

Additionally or alternatively, it may be determined if one or more measured quality metrics for the slice area distribution and/or other aspects of the current 3D design (e.g., with the object(s) in a current position/orientation) or the overall quality metric is improved as discussed above over the one or more measured quality metrics or the overall quality metric of the slice area distribution and/or other aspects of a previous 3D design (e.g., with the object(s) in a previous position/orientation). For example, as discussed with respect to block 335, if the slice area distribution and/or other aspects of the 3D design does not meet the criteria based on the one or more quality metrics, the object(s) may be rearranged to generate a new 3D design with a new slice area distribution and/or other aspects. If the slice area distribution and/or other aspects of the current 3D design has an improved quality metric over the previous 3D design, then the current 3D design is selected as the current 3D design. If the slice area distribution and/or other aspects of the current 3D design has a worse quality metric over the previous 3D design, then the previous 3D design is selected as the current 3D design. In some such embodiments, there may be a counter as the criteria that keeps track of the number of 3D designs that have been measured against the quality metric, and when the counter equals or exceeds a threshold value, the current 3D design is selected as the 3D design for printing and the process 300 moves to a block 345. In some embodiments, the counter value is reset to 0 if the current 3D design has an improved quality metric over the previous 3D design. If the counter is less than the threshold value, the process move to a block 335.

In some embodiments, in addition or alternatively to a counter that keeps track of the number of 3D designs that have been measured against the quality metrics, there may be a timer that keeps track of the time spent adjusting the 3D design and/or the time spent on the process 300 overall as the criteria, and if that time equals or exceeds a threshold value and/or the counter equals or exceeds a threshold value, the current 3D design is selected as the 3D design for printing and the process 300 moves to a block 345. In some embodiments, the timer value/time is reset to 0 if the current 3D design has an improved quality metric over the previous 3D design. If the timer and/or counter is less than its respective threshold value, the process move to a block 335.

At a block 335, the 3D design is adjusted by the computing device and the process returns to the block 320. Accordingly, the 3D design is iteratively adjusted based on the process moving between blocks 320, 330, and 335, until the 3D design meets the criteria. In some embodiments, the criteria used for each iteration may be the same. In some embodiments, the criteria used for any given iteration is automatically selected, such as by the computing device. In some embodiments, the criteria used for any given iteration may be user selectable as discussed above. For example, a 3D nester or 2D nester program may perform the adjustments. In some embodiments, a metric based on the (e.g., a function of) slice area distribution of the 3D design is passed to the 3D nester or 2D nester program that performs the adjustments. Accordingly, the 3D nester or 2D nester program can compare 3D designs to make better adjustments. In some embodiments, the 3D objects in the digital representation of the 3D design may be one or more of repositioned, reoriented, rotated, etc. The adjustments may be made in fixed intervals based on the slice area distribution and/or other aspects of the 3D design and the quality metric(s) used for measuring of the 3D design. The adjustments also may be made according to one or more restrictions. For example, as discussed herein, fixed objects or parts of objects may not be adjusted. In another example, alternatively or additionally, the restrictions may include one or more of the following: part interval (e.g., objects or parts of objects need to be placed with a certain distance in-between to avoid local heating issues), part geometry (e.g., certain parts with big flat surfaces need to be parallel to a platform of the 3D printer), etc.

Figure 5:
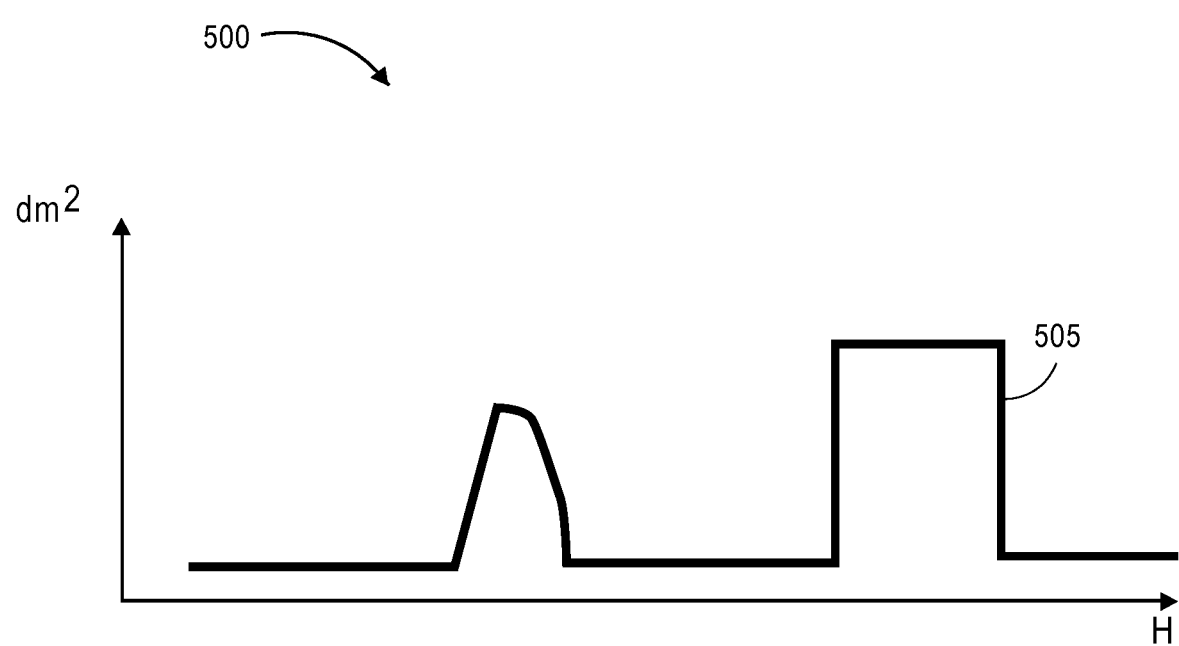
FIG. 5 depicts an example of a graph that represents the slice area distribution of the fixed objects or parts of objects of a 3D design.
Figure 6:
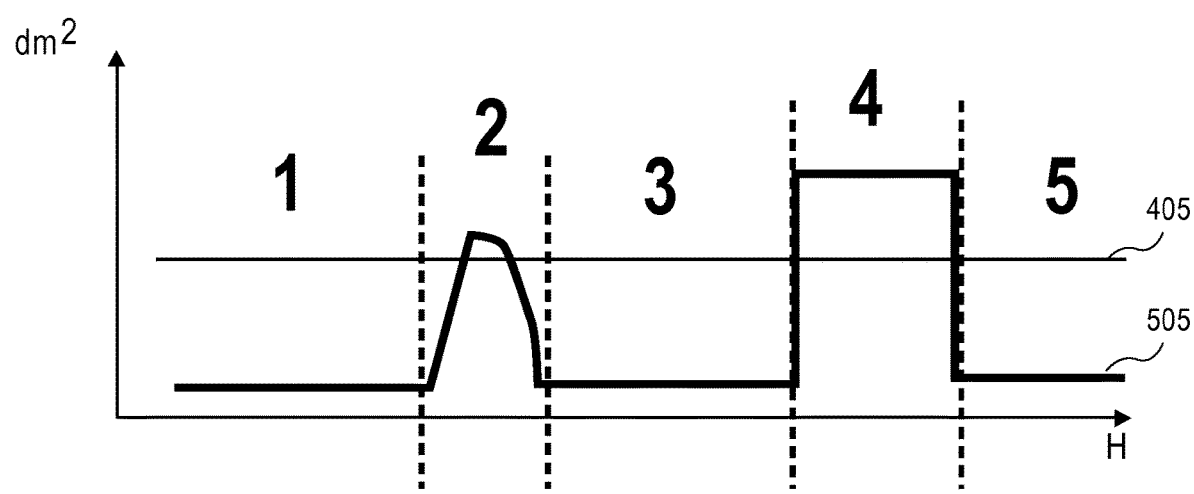
FIG. 6 depicts an example of a segmentation of the slice area distribution represented by FIG. 5.

In some embodiments, the fixed objects or parts of objects may affect the adjustments made in a similar fashion as the following example. FIG. 5 is an example of a graph 500 that represents the slice area distribution of the fixed objects or parts of objects of the 3D design as a curve 505. Further, FIG. 6 illustrates an example of the slice area distribution of the fixed objects or parts of objects of the 3D design being segmented into one or more portions (corresponding to contiguous heights of the 3D design) by the computing device. The segmentation is based on the calculated average slice area per height. For example, each contiguous portion of the slice area distribution (i.e., related to contiguous slices in height of the design) that has slices with a relatively large slice area per slice, such as represented by large peaks in the graph of FIG. 5 are shown as individual segmented portions of the slice area distribution. A relatively large slice area per slice is any contiguous portion of the slice area distribution that has at least one slice that exceeds the average slice area per height. Any remaining contiguous portions of the slice area distribution are also segmented into portions. FIG. 6 illustrates an example of the segmentation of the slice area distribution represented by FIG. 5 into portions 1, 2, 3, 4, and 5.

Accordingly, the portions segmented based on having a relatively large slice area per slice (as shown portions 2 and 4) are portions (corresponding to heights in 3D space) that will have a relatively low probability of further objects or parts of objects being placed in those portions, as the slice area of the slices at the heights in that portion already exceeds the average slice area per height. The remaining portions (as shown portions 1, 3, and 5) are portions that will have a relatively high probability of further objects or parts of objects being placed in those portions.

In some embodiments, the restrictions may be specific to the type of technology (e.g., SL, LS, metal printing). For example, in SL, the maximal occupied height of the 3D design may be important to be a certain value or less than a certain value. Therefore, there may be a restriction on moving objects or parts of objects in the 3D design in the z-axis or height direction. Further, for some technologies, some objects or parts of objects of the 3D design may have what are referred to as an "A surface" and a "B surface." The A surface is usually the surface that is most important and needs to have a certain level or quality of finishing degree. The B surface does not have the same restriction. Accordingly, the A surface of an object may need to be oriented in a particular way so that it is easy to finish (e.g., avoid use of supports), thus restricting the orientation of such objects in the 3D design. For example, such objects with an A surface may be limited to a rotation of only about 5-10 degrees over the x-axis and/or y-axis, and/or freely rotated over the z-axis.

In another example, for metal or for other technologies, additionally or alternatively, the gravity center of objects, influence of generated supports on the objects, position of cavities in the objects, and/or large walls on the objects may be examples of restrictions.

At a block 345, the 3D design is finalized and sent for manufactured to an additive manufacturing device. At a block 350, the 3D design is manufactured using an additive manufacturing device.

It should be noted that the processes described herein with respect to certain figures are merely exemplary embodiments, and that some of the blocks and steps of the processes may be performed in a different order, removed, and/or additional blocks and steps added to the processes while still being within the scope of the invention.

Figure 11:
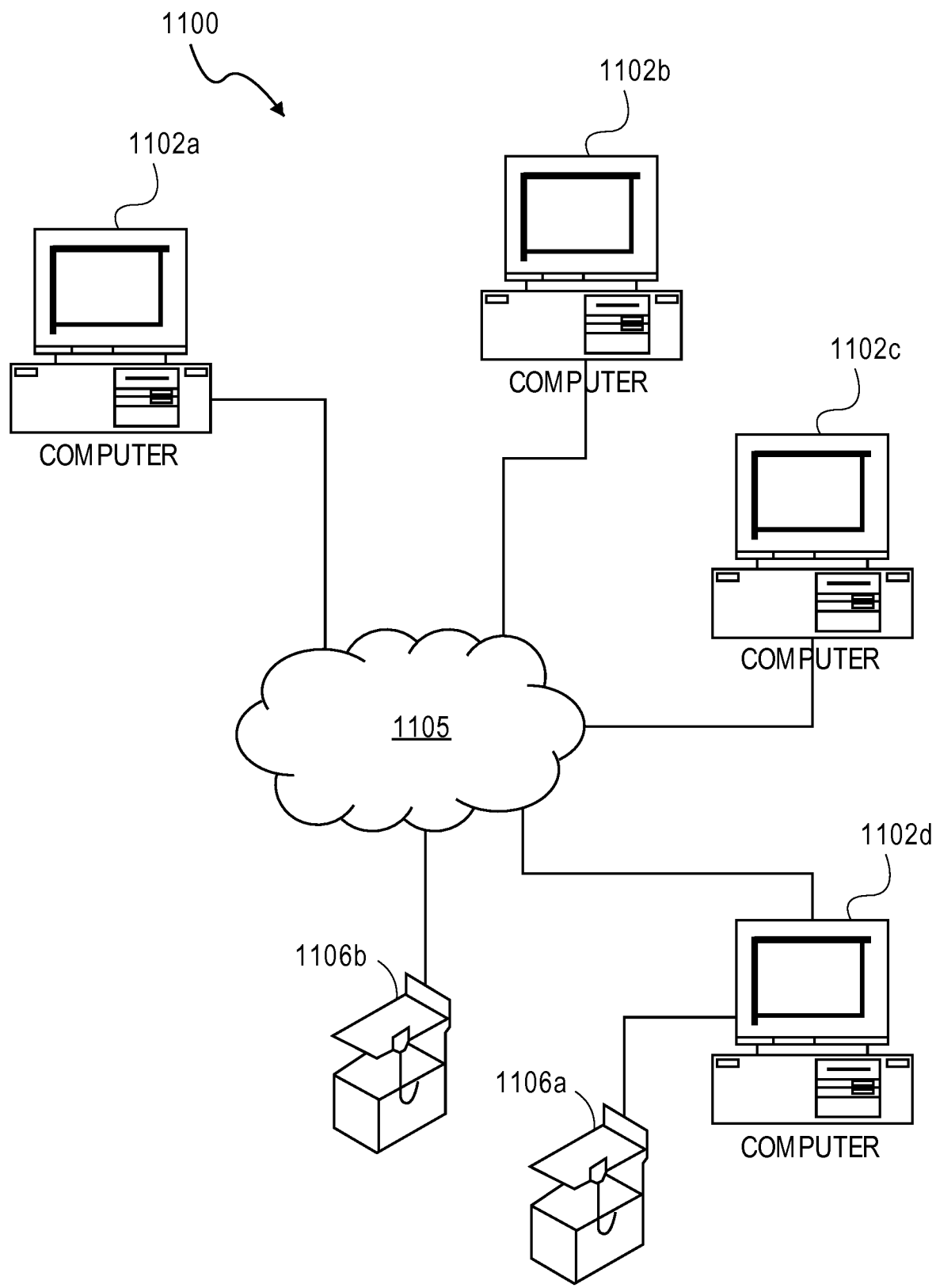
FIG. 11 depicts an exemplary system for designing and manufacturing an object by additive manufacturing

FIG. 11 illustrates one example of a system 1100 for designing and manufacturing object by additive manufacturing, including, for example, 3D designs. The system 1100 may be configured to support the techniques described herein.

In some embodiments, the system 1100 may include one or more computers 1102a-1102d. The computers 1102a-1102d may take various forms such as, for example, any workstation, server, or other computing device capable of processing information. The computers 1102a-1102d may be connected by a computer network 1105. The computer network 1105 may be, for example, the Internet, a local area network, a wide area network, or some other type of network capable of digital communications between electronic devices. Additionally, the computers 1102a-1102d may communicate over the computer network 1105 via any suitable communications technology or protocol. For example, the computers 1102a-1102d may share data by transmitting and receiving information such as software, digital representations of 3D objects and designs, commands and/or instructions to operate an additive manufacturing device, and the like.

The system 1100 further may include one or more additive manufacturing devices 1106a and 1106b. These additive manufacturing devices may comprise 3D printers or some other manufacturing device as known in the art. In the example shown in FIG. 11, the additive manufacturing device 1106a is directly connected to the computer 1102d. The additive manufacturing device 1106a is also connected to computers 1102a-1102c via the network 1105, which further connects computers 1102a-1102d. Additive manufacturing device 1106b is also connected to the computers 1102a-1102d via the network 1105. A skilled artisan will readily appreciate that an additive manufacturing device such as devices 1106a and 1106b may be directly connected to a computer, connected to a computer, and/or connected to a computer via another computer.

Although a specific computer and network configuration is described in FIG. 11, a skilled artisan will also appreciate that the additive manufacturing techniques described herein may be implemented using a single computer configuration which controls and/or assists the additive manufacturing device 1106, without the need for a computer network.

Figure 12:
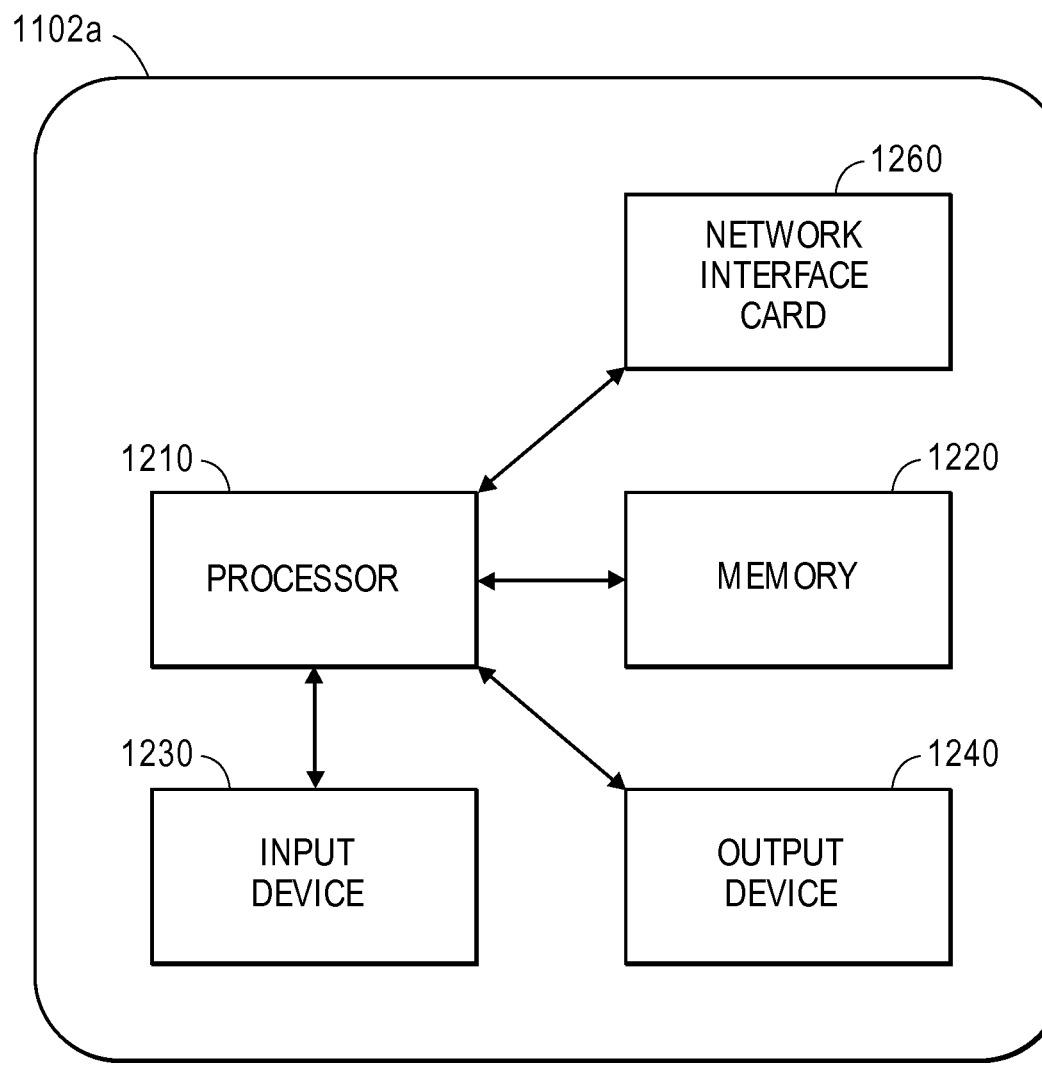
FIG. 12 depicts a functional block diagram of one example of a computer of FIG. 11.

FIG. 12 illustrates a more detailed view of computer 1102a illustrated in FIG. 11. The computer 1102a includes a processor 1210. The processor 1210 is in data communication with various computer components. These components may include a memory 1220, an input device 1230, and an output device 1240. In certain embodiments, the processor may also communicate with a network interface card 1260. Although described separately, it is to be appreciated that functional blocks described with respect to the computer 1102a need not be separate structural elements. For example, the processor 1210 and network interface card 1260 may be embodied in a single chip or board.

The processor 1210 may be a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 1210 may be coupled, via one or more data buses, to read information from or write information to memory 1220. The processor may additionally, or in the alternative, contain memory, such as processor registers. The memory 1220 may include processor cache, including a multi-level hierarchical cache in which different levels have different capacities and access speeds. The memory 1220 may further include random access memory (RAM), other volatile storage devices, or non-volatile storage devices. The storage can include hard drives, optical discs, such as compact discs (CDs) or digital video discs (DVDs), flash memory, floppy discs, magnetic tape, Zip drives, USB drives, and others as are known in the art.

The processor 1210 may also be coupled to an input device 1230 and an output device 1240 for, respectively, receiving input from and providing output to a user of the computer 1102a. Suitable input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to a computer. The input device may also take the form of a touch-screen associated with the display, in which case a user responds to prompts on the display by touching the screen. The user may enter textual information through the input device such as the keyboard or the touch-screen. Suitable output devices include, but are not limited to, visual output devices, including displays and printers, audio output devices, including speakers, headphones, earphones, and alarms, additive manufacturing devices, and haptic output devices.

The processor 1210 further may be coupled to a network interface card 1260. The network interface card 1260 prepares data generated by the processor 1210 for transmission via a network according to one or more data transmission protocols. The network interface card 1260 may also be configured to decode data received via the network. In some embodiments, the network interface card 1260 may include a transmitter, receiver, or both. Depending on the specific embodiment, the transmitter and receiver can be a single integrated component, or they may be two separate components. The network interface card 1260, may be embodied as a general purpose processor, a DSP, an ASIC, a FPGA, or other programmable logic device, discrete gate or transistor logic, discrete hardware components, or any suitable combination thereof designed to perform the functions described herein.

Figure 13:
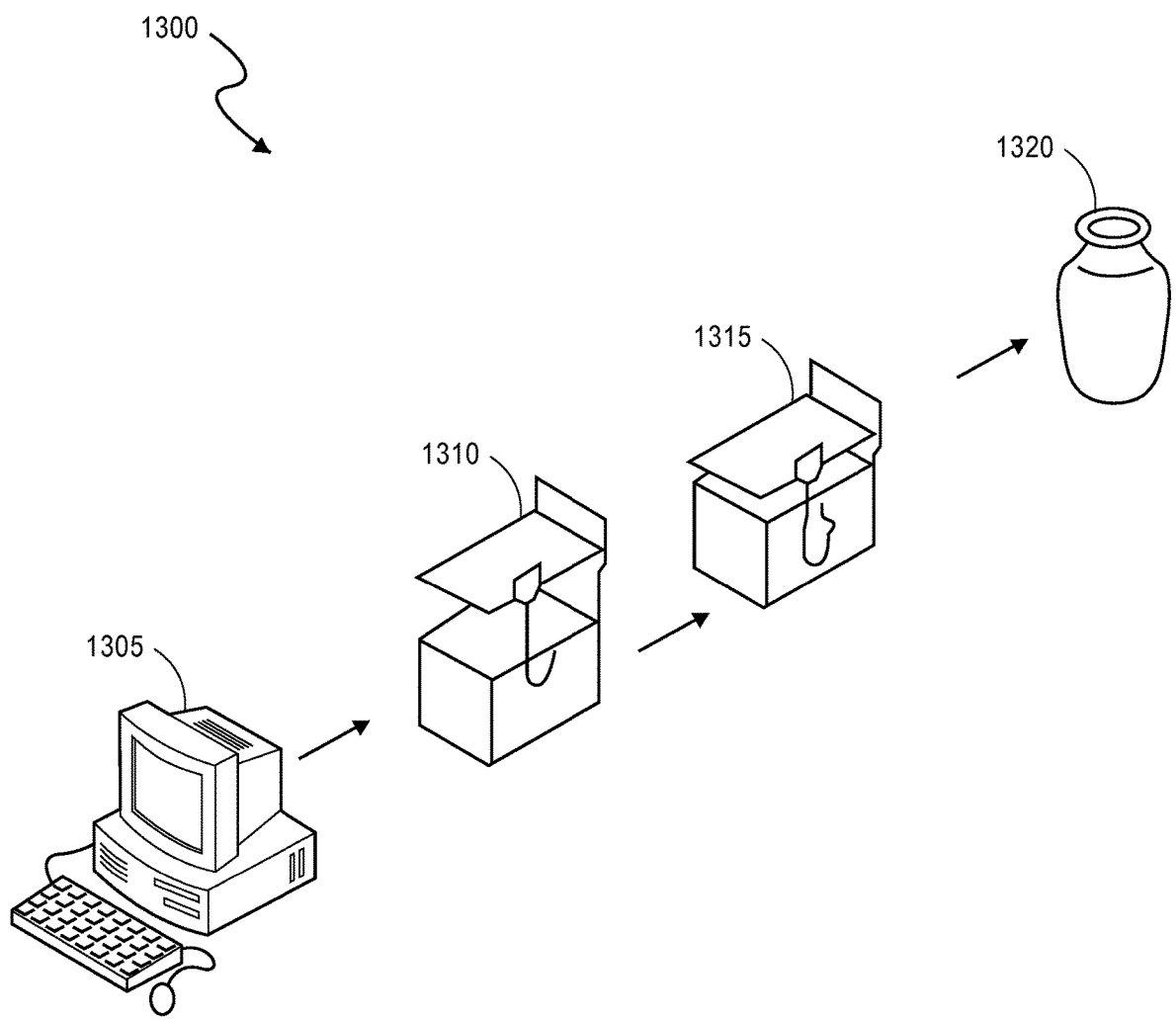
FIG. 13 depicts a process for manufacturing a 3D object.

FIG. 13 illustrates a general process 1300 for manufacturing an object using an additive manufacturing apparatus, such as 1106a or 1106b in FIG. 11.

The process begins at step 1305, where a digital representation of the 3D design to be manufactured is designed using a computer, such as the computer 1102a in FIG. 11. In some embodiments, a 2D representation of the device may be used to create a 3D model of the device. Alternatively, 3D data may be input to the computer 1102a for aiding in designing the digital representation of the 3D design. Additionally or alternatively, the 3D design is generated using embodiments of the process described with respect to FIG. 3. In some embodiments, the computer 1102a is the computing device described with respect to FIG. 3. The process continues to step 1310, where information is sent from the computer 1102a to an additive manufacturing device, such as additive manufacturing devices 1106a and 1106b. Next, at step 1315, the additive manufacturing device begins manufacturing the 3-D device by performing an additive manufacturing process using suitable materials, as described above. Using the appropriate materials, the additive manufacturing device then completes the process at step 1320, where the 3D object is completed.

Various specific additive manufacturing techniques may be used to produce objects using a method like that shown in FIG. 13. As explained above, these techniques include SL, LS, and SLM, among others.

The invention disclosed herein may be implemented as a method, apparatus, or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, FPGAs, ASICs, complex programmable logic devices (CPLDs), programmable logic arrays (PLAs), microprocessors, or other similar processing devices.

It will be appreciated by persons skilled in the art that numerous variations and/or modifications may be made to the invention without departing from the spirit or the scope of the invention as broadly described. The above described embodiments are, therefore, to be considered in all respects as illustrative and not restrictive.

What is claimed is:

1. A method for improved 3D printing, the method comprising:
   calculating, on a computing device, a slice area distribution of a 3D design, wherein the slice area distribution comprises slice areas of a plurality of slices of the 3D design corresponding to a plurality of parallel planes along an axis;
   determining, on the computing device, if based on the calculated slice area distribution a criteria based on one or more quality metrics is met, wherein:
   the one or more quality metrics comprise one or more of the following: a maximum amplitude of a curve based on the calculated slice area distribution, wherein the curve is defined as a slice area, of each of the plurality of slices, as a function of height of each slice along a z-axis of the 3D design, a maximum frequency of the curve, a maximum smoothness of the curve, a slope of the curve, a maximum slice area minus a minimum slice area of slices of the calculated slice area distribution, and a maximum difference in slice area between adjacent slices of the calculated slice area distribution, and
   the one or more quality metrics comprise the maximum difference in slice area between adjacent slices of the calculated slice area distribution;
   adjusting the 3D design in the computing device if the criteria is not met, wherein adjusting is performed based on one or more restrictions; and
   finalizing the 3D design in the computing device to instruct manufacture by an additive manufacturing apparatus,
   wherein the computing device generates instructions for printing slices of the 3D design on the additive manufacturing apparatus, wherein the one or more quality metrics of the slice area distribution meet the criteria, thereby improving the 3D printing.

2. The method of claim 1, wherein the criteria comprises one or more quality metrics meeting one or more respective threshold values.

3. The method of claim 1, wherein the criteria comprises at least one of a timer or a counter meeting a threshold value.

4. The method of claim 3, further comprising:
   calculating an adjusted slice area distribution based on the adjusted 3D design;
   comparing the adjusted slice area distribution to the calculated slice area distribution based on the one or more quality metrics; and
   selectively resetting the at least one of the timer or the counter based on the comparison.

5. The method of claim 1, wherein adjusting the 3D design comprises at least one of the following: repositioning one or more of objects of the 3D design, reorienting one or more of the objects of the 3D design, and rotating one or more of the objects of the 3D design.

6. The method of claim 1, wherein the one or more restrictions comprise at least one of the following: a part interval, a part geometry, one or more fixed objects of the 3D design, a maximum height of the 3D design, a required surface type for a surface of an object of the 3D design, a gravity center of an object of the 3D design, an influence of generated supports, a position of cavities, and presence of large walls on the 3D design.

7. The method of claim 1, further comprising manufacturing the 3D design using the additive manufacturing apparatus.

8. The method of claim 1, wherein the adjusting comprises iteratively adjusting the 3D design until the criteria is met.

9. The method of claim 1, further comprising determining if a height of the 3D design meets a threshold value; and adjusting the 3D design if the height does not meet the threshold value.

10. An apparatus for improved 3D printing, the apparatus comprising: a memory; and a processor configured to:
    calculate a slice area distribution of a 3D design, wherein the slice area distribution comprises slice areas of a plurality of slices of the 3D design corresponding to a plurality of parallel planes along an axis;

determine if based on the calculated slice area distribution a criteria based on one or more quality metrics is met, wherein:

the one or more quality metrics comprise one or more of the following: a maximum amplitude of a curve based on the calculated slice area distribution, wherein the curve is defined as a slice area, of each of the plurality of slices, as a function of height of each slice along a z-axis of the 3D design, a maximum frequency of the curve, a maximum smoothness of the curve, a slope of the curve, a maximum slice area minus a minimum slice area of slices of the calculated slice area distribution, and a maximum difference in slice area between adjacent slices of the calculated slice area distribution, and the one or more quality metrics comprise the maximum difference in slice area between adjacent slices of the calculated slice area distribution;

adjust the 3D design if the criteria is not met, wherein adjusting is performed based on one or more restrictions; and finalize the 3D design to instruct manufacture by an additive manufacturing apparatus, wherein the processor generates instructions for printing slices of the 3D design on the additive manufacturing apparatus, wherein the one or more quality metrics of the slice area distribution meet the criteria, thereby improving the 3D printing on the apparatus.

11. The apparatus of claim 10, wherein the criteria comprises one or more quality metrics meeting one or more respective threshold values.

12. The apparatus of claim 10, wherein the criteria comprises at least one of a timer or a counter meeting a threshold value.

13. The apparatus of claim 12, wherein the processor is further configured to:

calculate an adjusted slice area distribution based on the adjusted 3D design;

compare the adjusted slice area distribution to the calculated slice area distribution based on the one or more quality metrics; and selectively reset the at least one of the timer or the counter based on the comparison.

14. The apparatus of claim 10, wherein the processor being configured to adjust the 3D design comprises the processor being configured to perform at least one of the following:

reposition one or more of objects of the 3D design, reorient one or more of the objects of the 3D design, and rotate one or more of the objects of the 3D design.

15. The apparatus of claim 10, wherein the processor is configured to adjust the 3D design based on the one or more restrictions comprising at least one of the following:

a part interval, a part geometry, one or more fixed objects of the 3D design, a maximum height of the 3D design, a required surface type for a surface of an object of the 3D design, a gravity center of an object of the 3D design, an influence of generated supports, a position of cavities, and presence of large walls on the 3D design.

16. The apparatus of claim 10, wherein the processor is further configured to direct manufacturing of the 3D design using the additive manufacturing apparatus.

17. The apparatus of claim 10, wherein the processor being configured to adjust the 3D design comprises the processor being configured to iteratively adjust the 3D design until the criteria is met.

18. The apparatus of claim 10, wherein the processor is further configured to:

determine if a height of the 3D design meets a threshold value; and adjust the 3D design if the height does not meet the threshold value.

19. A non-transitory computer-readable medium comprising instructions that when executed by a computer cause the computer to perform a method for improved 3D printing, the method comprising:

calculating, on a computing device, a slice area distribution of a 3D design, wherein the slice area distribution comprises slice areas of a plurality of slices of the 3D design corresponding to a plurality of parallel planes along an axis;

determining if based on the calculated slice area distribution a criteria based on one or more quality metrics is met, wherein:

the one or more quality metrics comprise one or more of the following: a maximum amplitude of a curve based on the calculated slice area distribution, wherein the curve is defined as a slice area. of each of the plurality of slices, as a function of height of each slice along a z-axis of the 3D design, a maximum frequency of the curve, a maximum smoothness of the curve, a slope of the curve, a maximum slice area minus a minimum slice area of slices of the calculated slice area distribution, and a maximum difference in slice area between adjacent slices of the calculated slice area distribution, and the one or more quality metrics comprise the maximum difference in slice area between adjacent slices of the calculated slice area distribution;

adjusting the 3D design in the computing device if the criteria is not met, wherein adjusting is performed based on one or more restrictions; and finalizing the 3D design in the computing device to instruct manufacture by an additive manufacturing apparatus, thereby generating instructions for printing slices of the 3D design on the additive manufacturing apparatus, wherein the one or more quality metrics of the slice area distribution meet the criteria, thereby improving the 3D printing.

20. The method of claim 1, wherein the 3D design comprises multiple 3D objects in the design.

21. The apparatus of claim 10, wherein the 3D design comprises multiple 3D objects in the design.

* * * * *